US011794401B2

(12) United States Patent
Liang et al.

(10) Patent No.: US 11,794,401 B2
(45) Date of Patent: *Oct. 24, 2023

(54) HIGH-EFFICIENCY FILAMENT HELICAL WINDING DEVICES

(71) Applicant: TAIYUAN UNIVERSITY OF TECHNOLOGY, Shanxi (CN)

(72) Inventors: Jianguo Liang, Taiyuan (CN); Weilin Yin, Taiyuan (CN); Chunjiang Zhao, Taiyuan (CN); Yanchun Zhu, Taiyuan (CN); Chen Wang, Taiyuan (CN); Qi Zhang, Taiyuan (CN); Xiaodong Zhao, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,044

(22) Filed: Oct. 20, 2022

(65) Prior Publication Data
US 2023/0069166 A1   Mar. 2, 2023

Related U.S. Application Data

(63) Continuation of application No. 17/805,463, filed on Jun. 5, 2022, now Pat. No. 11,511,476.

(30) Foreign Application Priority Data

Jun. 7, 2021   (CN) .......................... 202110633540.1

(51) Int. Cl.
*B29C 53/70*   (2006.01)
*B29C 53/60*   (2006.01)
*B29L 31/00*   (2006.01)

(52) U.S. Cl.
CPC ............ *B29C 53/70* (2013.01); *B29C 53/602* (2013.01); *B29L 2031/7156* (2013.01)

(58) Field of Classification Search
CPC ...................................................... B29C 53/70
See application file for complete search history.

(56) References Cited

U.S. PATENT DOCUMENTS 4,172,562 A   10/1979   Smith
5,203,249 A    4/1993   Adams et al.
(Continued)

FOREIGN PATENT DOCUMENTS

CN   112477084 A     3/2021
EP     2060384 A1 *  5/2009
(Continued)

OTHER PUBLICATIONS

First Office Action in Chinese Application No. 202110633540.3 dated Mar. 11, 2022, 14 pages.

*Primary Examiner* — Jeffry H Aftergut
(74) *Attorney, Agent, or Firm* — METIS IP LLC

(57) ABSTRACT

The present disclosure provides a high-efficiency filament helical winding device, which includes a frame body and a plurality of multi-filar guides. The frame body is provided with a through-hole, the plurality of multi-filar guides distributed in a circumference along a center of the through-hole are rotationally connected to the frame body and filament is extended out from each multi-filar guide in the plurality of multi-filar guides, and the frame body is provided with a first driving mechanism that drives each multi-filar guide to rotate.

20 Claims, 12 Drawing Sheets

(56) References Cited

U.S. PATENT DOCUMENTS

| | | |
|---|---|---|
| 7,566,376 B2 | 7/2009 | Matsuoka |
| 8,955,787 B2 | 2/2015 | Tanigawa et al. |
| 8,967,521 B2 | 3/2015 | Tanigawa et al. |
| 11,511,476 B1 * | 11/2022 | Liang .................. B29C 53/8016 |
| 2009/0126875 A1 | 5/2009 | Uozumi et al. |
| 2009/0127373 A1 | 5/2009 | Uozumi et al. |
| 2009/0314418 A1 | 12/2009 | Uozumi et al. |
| 2010/0032510 A1 | 2/2010 | Tanigawa et al. |
| 2013/0186996 A1 | 7/2013 | Tanigawa et al. |
| 2015/0075702 A1 | 3/2015 | Tanigawa et al. |
| 2015/0329315 A1 | 11/2015 | Hatta et al. |
| 2021/0197501 A1 | 7/2021 | Ikezaki et al. |

FOREIGN PATENT DOCUMENTS

| | | |
|---|---|---|
| EP | 2151311 A1 | 2/2010 |
| JP | 2000334853 A | 12/2000 |

* cited by examiner

HIGH-EFFICIENCY FILAMENT HELICAL WINDING DEVICES

CROSS-REFERENCE TO RELATED APPLICATIONS

This application is a continuation of U.S. application Ser. No. 17/805,463, filed on Jun. 5, 2022, which claims priority to Chinese Patent Application No. 202110633540.3 filed on Jun. 7, 2021, the contents of which are hereby incorporated by reference to its entirety.

TECHNICAL FIELD

The present disclosure relates to the field of filament winding technology, and in particular, to high-efficiency filament helical winding devices.

BACKGROUND

After years of development, pressure vessels have been widely used in aerospace, medical care, and daily resident lives. With continuous emergence of new materials and new technology, the pressure vessels are developing in a lightweight and high-intensity direction. Filament winding is one of important steps in the molding process of the pressure vessels, and helical winding technology is more common. Winding efficiency and winding quality of directly determine productivity, performance, and service life of components such as the pressure vessels.

Thereby, it is desirable to provide high-efficiency filament helical winding devices to improve the winding efficiency and winding quality.

SUMMARY

One aspect of some embodiments of the present disclosure provides a high-efficiency helical winding device. The device includes a frame body and a plurality of multi-filar guides, the frame body is provided with a through-hole, the plurality of multi-filar guides distributed in a circumference along the center of the through-hole are rotationally connected to the frame body, and filament is extended out from each multi-filar guide in the plurality of multi-filar guides. The frame body is provided with a first driving mechanism that drives each multi-filar guide to rotate. Each multi-filar guide is rotationally connected to the frame body through a coupling sleeve, the coupling sleeve is rotationally connected to the frame body, each multi-filar guide is slidably connected to the coupling sleeve. The first driving mechanism is connected to the coupling sleeve to drive each multi-filar guide to rotate. The device further includes a telescopic mechanism that drives each multi-filar guide to slide along the coupling sleeve. The telescopic mechanism includes a plurality of shifting fork mechanisms and a second driving mechanism, and each multi-filar guide is connected a shifting fork mechanism in the plurality of shifting fork mechanisms, the shifting fork mechanism includes a shifting fork and a guide rod, the guide rod is fixedly connected to the frame body, the shifting fork is slidably connected to the guide rod, and one end of the shifting fork is rotationally connected to the multi-filar guide. The second driving mechanism is connected to the shifting folk to drive the shifting folk to slide along the guide rod. The second driving mechanism includes a second driving element, a second gear transmission mechanism, and a plurality of lead screw and nut mechanisms, each shifting fork is connected to a lead screw and nut mechanism, and one end of the lead screw in the lead screw and nut mechanism is fixedly connected to the shifting fork, and nut in the lead screw and nut mechanism is rotationally connected to the frame body. The second gear transmission mechanism includes a second gear ring and a plurality of second connecting columns. The second gear ring is rotationally connected to the frame body, and the second gear ring is driven to rotate through the second driving element. The plurality of second connecting columns are rotationally connected to the frame body, each lead screw and nut mechanism is connected to a second connecting column in the plurality of second connecting columns, the second connecting column is driven to rotate through rotation of the second gear ring, the second connecting column drives the multi-filar guide to expand and contract, one end of the second connecting column is provided with a second connecting gear meshing with the second gear ring, and the other end of the second connecting column is provided with a second transmission gear meshing with the external gear of the nut. The second gear ring is rotationally connected to the frame body through the slewing bearing, the second gear ring is slidably connected to the slewing bearing, a third driving mechanism is arranged between the second gear ring and the slewing bearing, and the second gear ring is driven to slide axially through the third driving mechanism. The plurality of second connecting columns are divided into at least two groups, the second gear ring is meshed with second connecting gears on one or more groups of second connecting columns through the movement of the second gear ring to drive the corresponding multi-filar guide to expand and contract. The second driving element is connected to the slewing bearing.

In some embodiments, the multi-filar guide may be a hollow rod with two openings at both ends, the filament may enter the hollow rod from an opening at one end and extend out from another opening at the other end, the other end of the hollow rod may be flat, and the shape of the other end may be the same as a cross-section shape of the filament.

In some embodiments, the first driving mechanism may include a first driving element and a first gear transmission mechanism, and the first driving element may be connected to each multi-filar guide through the first gear transmission mechanism to drive each multi-filar guide to rotate.

In some embodiments, the first gear transmission mechanism may include a first gear ring and a plurality of first connecting columns, the first gear ring may be rotationally connected to the frame body, and the first driving element may be connected to the first gear ring to drive the first gear ring to rotate, the plurality of first connecting columns may be rotationally connected to the frame body, each multi-filar guide may be connected to a first connecting column in the plurality of first connecting columns. The first connecting column may be driven to rotate through rotation of the first gear ring, the first connecting column may drive the multi-filar guide to rotate, one end of the first connecting column may be provided with a first connecting gear meshing with the first ring gear, and the other end of the first connecting column may be provided with a first transmission gear meshing with a first driving gear on the multi-filar guide.

In some embodiments, the first gear ring may be a double gear ring, inner gear of which may be meshed with the first connecting gear, outer gear of which may be meshed with the first driving element through a first worm or gears, and the first worm may be rotationally connected to the frame body.

In some embodiments, the second driving element may be meshed with gears of the slewing bearing through gears or a second worm to drive the second gear ring to rotate.

BRIEF DESCRIPTION OF THE DRAWINGS

The present disclosure will be further described in the form of exemplary embodiments, which will be described in detail by the accompanying drawings. These embodiments are not restrictive, in these embodiments, the same number represents the same structure, wherein.

DETAILED DESCRIPTION

Figure 1:
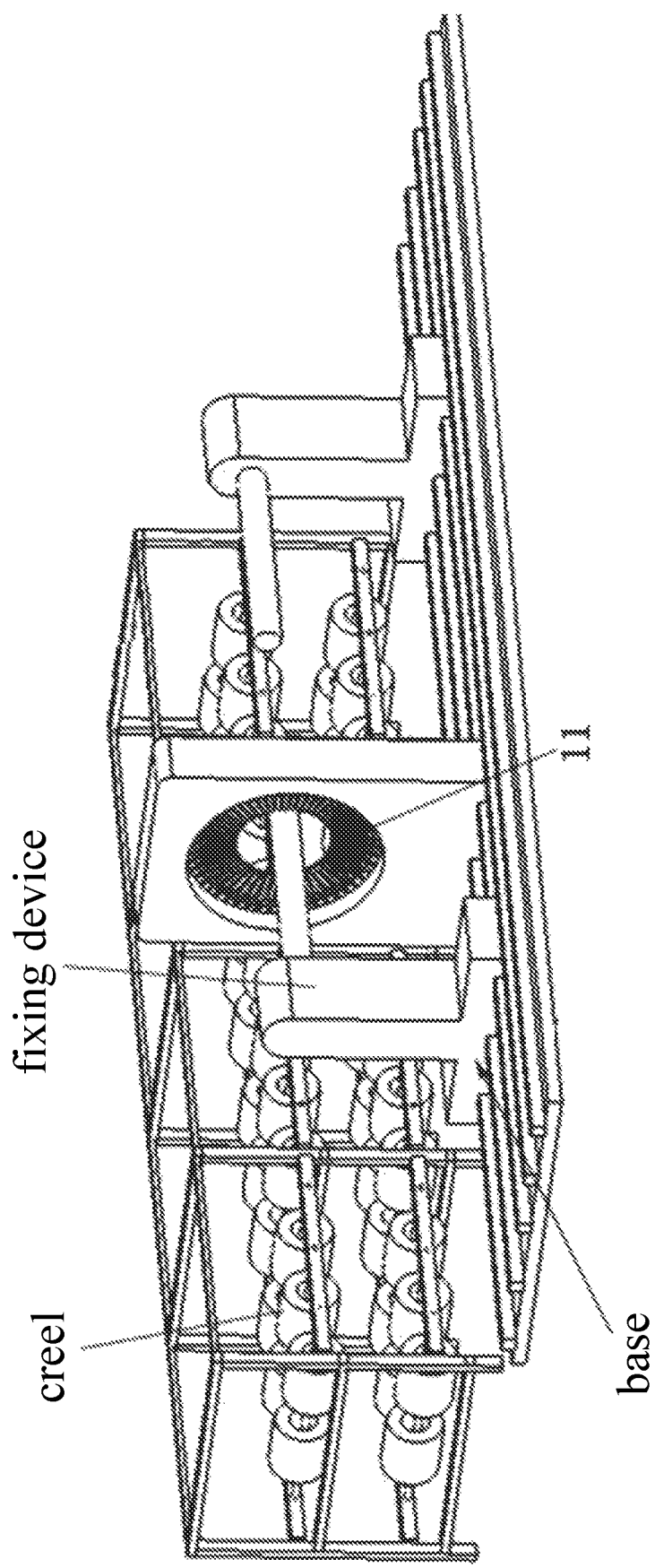
FIG. 1 is a schematic diagram of a helical winding device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. A person skilled in the art, without further creative efforts, may apply the present disclosure to other similar scenarios according to these drawings. Unless it is obvious or explained from the language environment or otherwise stated, the same number in the drawings denotes the same structure or operation.

It will be understood that the terms "system," "device," "unit," and/or "module" used herein are one method to distinguish different components, elements, parts, sections, or assemblies of different levels. However, if other words may achieve the same purpose, the words may be replaced by other expressions.

The terminology used herein is for the purposes of describing particular examples and embodiments only and is not intended to be limiting. As used herein, the singular forms "a," "an," and "the" may be intended to include the plural forms as well, unless the context clearly indicates otherwise. In general, the terms "comprise" and "include" merely prompt to include steps and elements that have been clearly identified, the steps and units do not constitute an exclusive list, and the method or device may also include other steps or units.

A flowchart is used in the present disclosure to explain the operation performed by the system according to the embodiment of the present disclosure. It should be understood that the foregoing or following operations may be not necessarily performed exactly in order. Instead, each step may be processed in reverse or simultaneously. Moreover, other operations may also be added into these procedures, or one or more steps may be removed from these procedures.

During the molding process of pressure vessels, a filament winding process is one of the important links. The filament winding process is to extend out filament bundle through a multi-filar guide and fixedly wind the filament bundle on a surface of a workpiece to be wound (or referred to as a workpiece).

FIG. 1 is a schematic diagram of a helical winding device according to some embodiments of the present disclosure.

Figure 2:
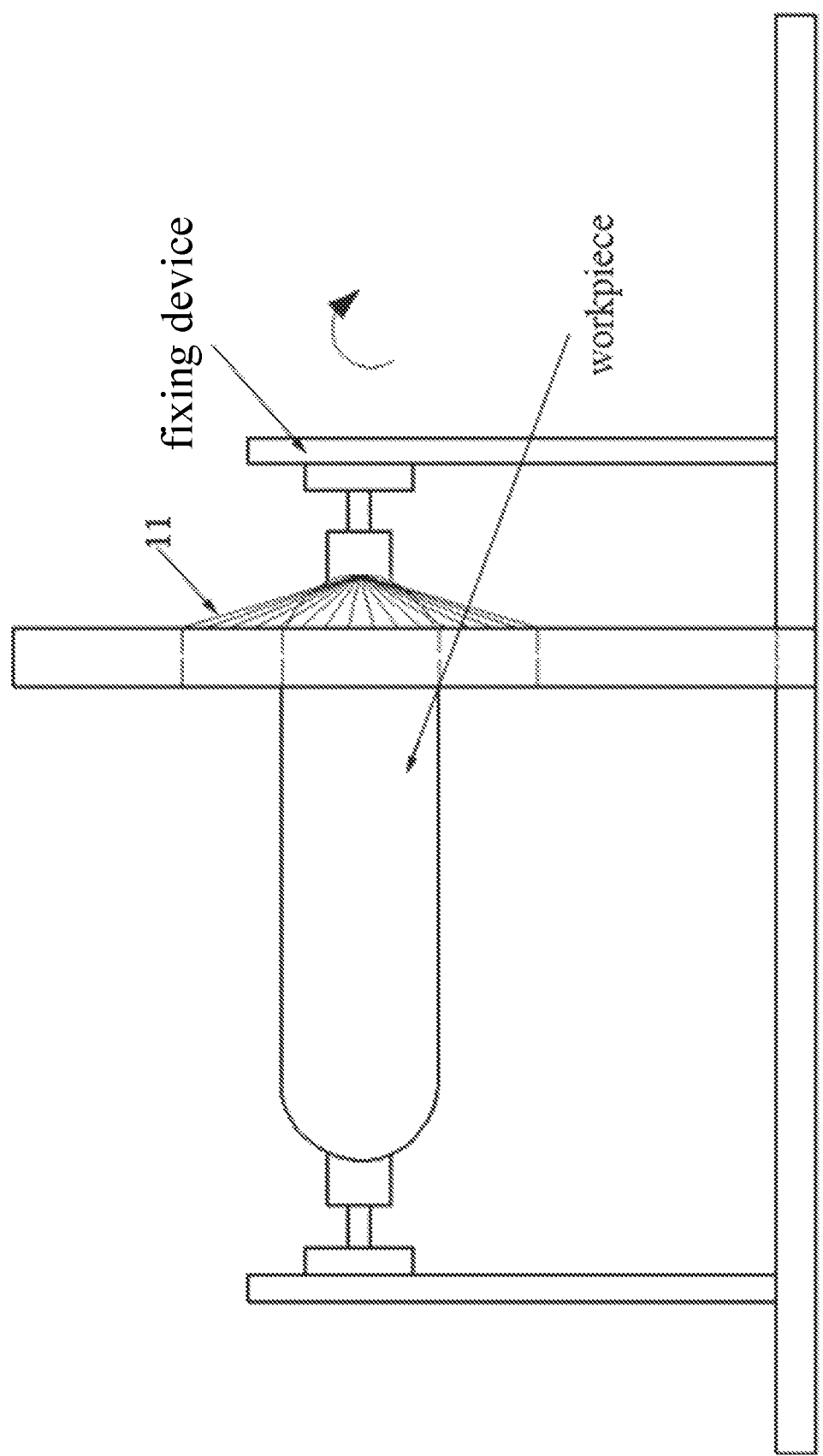
FIG. 2 is a schematic diagram of a helical winding device according to another embodiments of the present disclosure.

FIG. 2 is a schematic diagram of a helical winding device according to another embodiments of the present disclosure.

Figure 3:
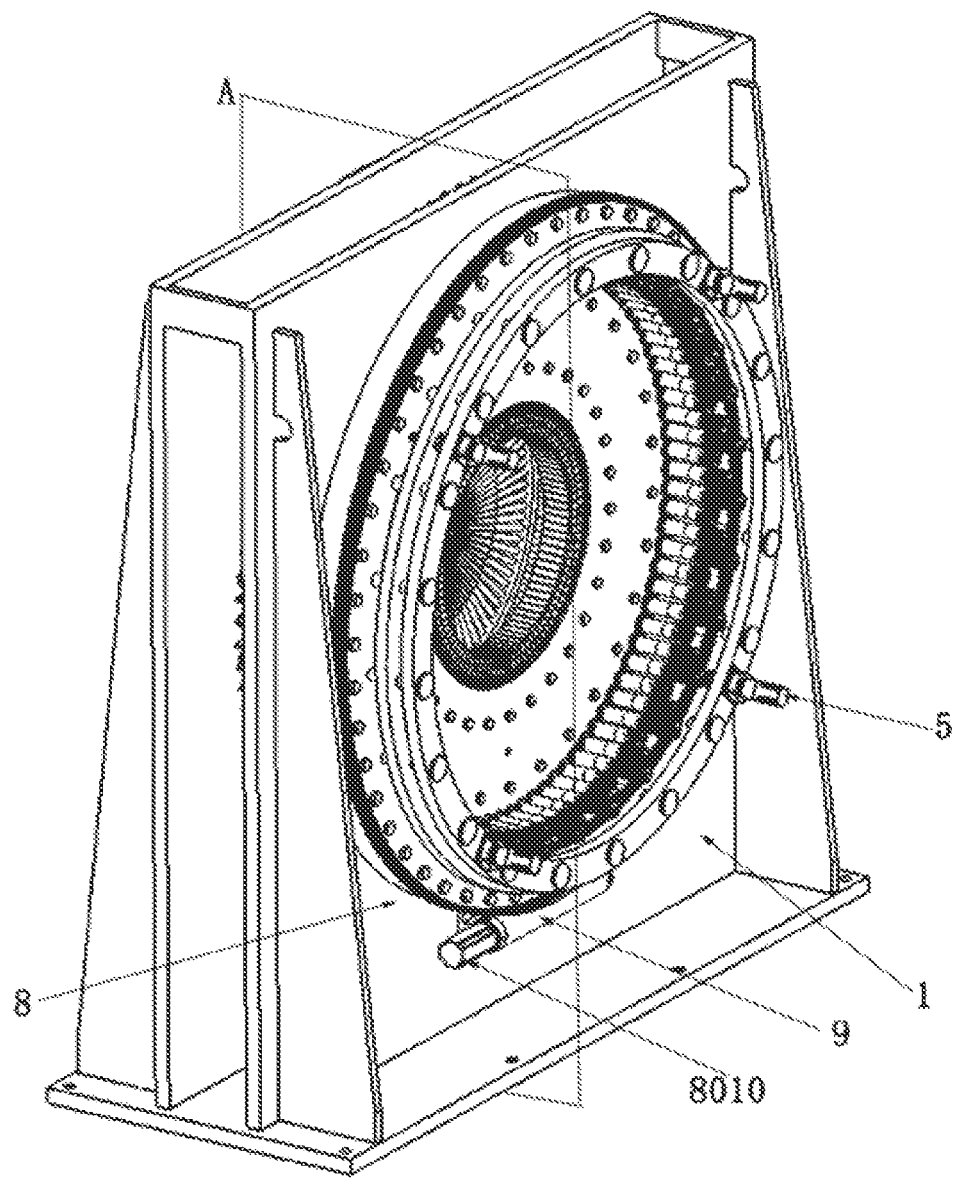
FIG. 3 is an axonometric view of a helical winding device in a direction according to some embodiments of the present disclosure.

FIG. 3 is an axonometric view of a helical winding device in a direction according to some embodiments of the present disclosure.

Figure 4:
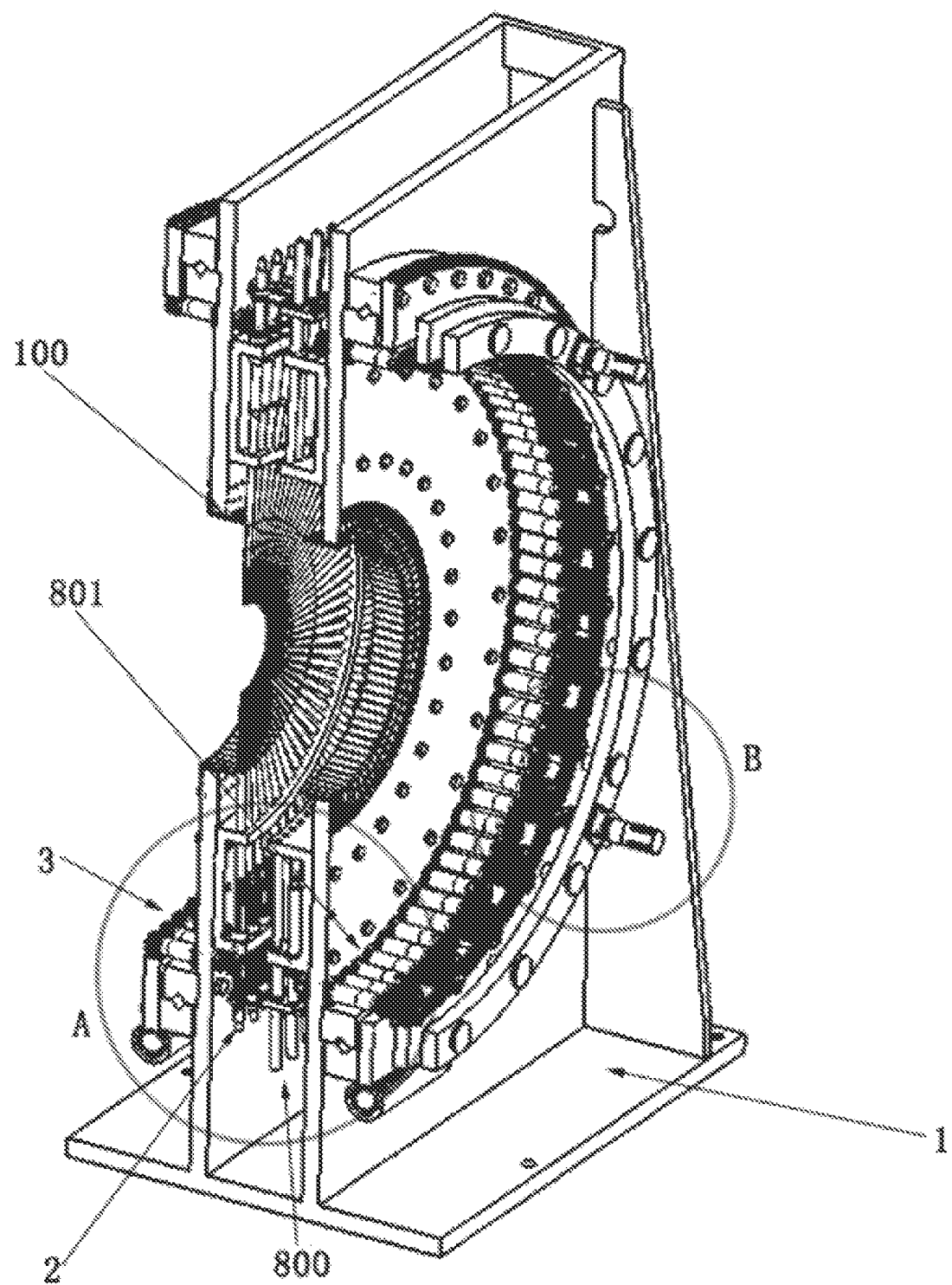
FIG. 4 is a sectional view of plane A in FIG. 3 according to some embodiments of the present disclosure.

FIG. 4 is a sectional view of plane A in FIG. 3 according to some embodiments of the present disclosure.

As shown in FIG. 4, in some embodiments, a high-efficiency filament helical winding device may include a frame body 1 provided with a through-hole 100 and a plurality of multi-filar guides, the plurality of multi-filar guides distributed in a circumference along a center of the through-hole 100 may be rotationally connected to the frame body 1, and filament may be extended out from each multi-filar guide 2 in the plurality of multi-filar guides, and the frame body 1 may be provided with a first driving mechanism 3 that drives each multi-filar guide 2 to rotate.

In some embodiments, the plurality of multi-filar guides distributed in the circumference along the center of the through-hole 100 may be rotationally connected to the frame body, filament may be extended out from each multi-filar guide 2 in the plurality of multi-filar guides, and the extended filaments may be evenly distributed on an outer surface of the pressure vessel with a helical shape, each multi-filar guide 2 may be driven to rotate to change an angle of the filament to achieve winding via the first driving mechanism 3 and rotation and movement of the pressure vessel. The high-efficiency filament helical winding device is used to wind, which may ensure that the filaments is distributed evenly and no overlapping or crossing exists between the filaments. Thus, while ensuring the winding efficiency, it may effectively reduce the use of the filaments.

The frame body may be used to support, connect, and fix components. In some embodiments, the frame body may be provided with the through-hole.

The multi-filar guide may be a component used to drag the filaments. The filaments may include glass filaments, carbon filaments, polyamide filaments, etc. The multi-filar guide may adopt a plurality of structural designs. As shown in FIG. 4, in some embodiments, the multi-filar guide 2 may be a hollow rod with two openings at both ends, the filament may enter the hollow rod from an opening at one end and extend out from other opening at the other end, the other end of the hollow rod may be flat, and a shape of the other opening at the other end may be the same as a cross-section shape of the filament. The flat shape of the other opening may prevent deformation of the multiple filament bundles in the plurality of multi-filar guides. The shape of the other opening may be the same as the cross-section shape of the filament, which may ensure that the filaments pass smoothly and the filaments are driven to rotate. The cross-shape of common filament is approximately rectangular, thus the shape of the other opening at the other end is also rectangular. Through the structural arrangements, the filaments may be driven to rotate accordingly while the plurality of multi-filar guides rotate. A gap between the other opening at the other end and the filaments may ensure the filaments passing through. Of course, a smaller gap may be designed on premise of ensuring the filaments passing through.

As shown in FIGS. 2 and 4, in some embodiments, when using the filament helical winding device, the workpiece to be wound may pass through the through-hole 100 on the frame body 1 and be fixed by a corresponding fixing device.

The fixing device may be used to fix the workpiece to be wound and drive the workpiece to rotate and move. The fixing device may be implemented with a plurality of structures, for example, a chunk and a moveable base, the chuck being set on the moveable base, the workpiece being clamped by the chunk and driven to rotate, and the chunk and the workpiece being driven to move by the moveable base.

As shown in FIGS. 1 and 2, in some embodiments, when winding using the filament helical winding device, filament bundles may be extended out from a creel and tension may be controlled by an existing tension controller, each filament bundle may pass through a corresponding multi-filar guide, a single filament bundle extended out from each multi-filar guide 2 may gather into multiple filaments, the multiple filaments bundles may be evenly distributed on the surface of the workpiece, and no overlapping or crossing exists between the filaments. Then the multiple filament bundles may be helically wound on the surface of the workpiece simultaneously through rotation and movement of the workpiece and rotation of each multi-filar guide 2. More descriptions regarding the multi-filar guide 2 may be found elsewhere in the present disclosure, e.g. FIG. 4 and its relevant descriptions thereof.

The tension controller (e.g., a mechanical tension controller, an electronic tension controller, etc.) may be used to regulate tension of the filaments bundle.

As shown in FIG. 4, in some embodiments, the multi-filar guide 2 may be designed as a telescopic structure, the multi-filar guide 2 may be expanded and contracted according to a shape change of the workpiece (e.g., an inner pot of the pressure vessel), thereby ensuring that the filaments may well fit an outside surface of the workpiece to further improve the winding effect.

Figure 5:
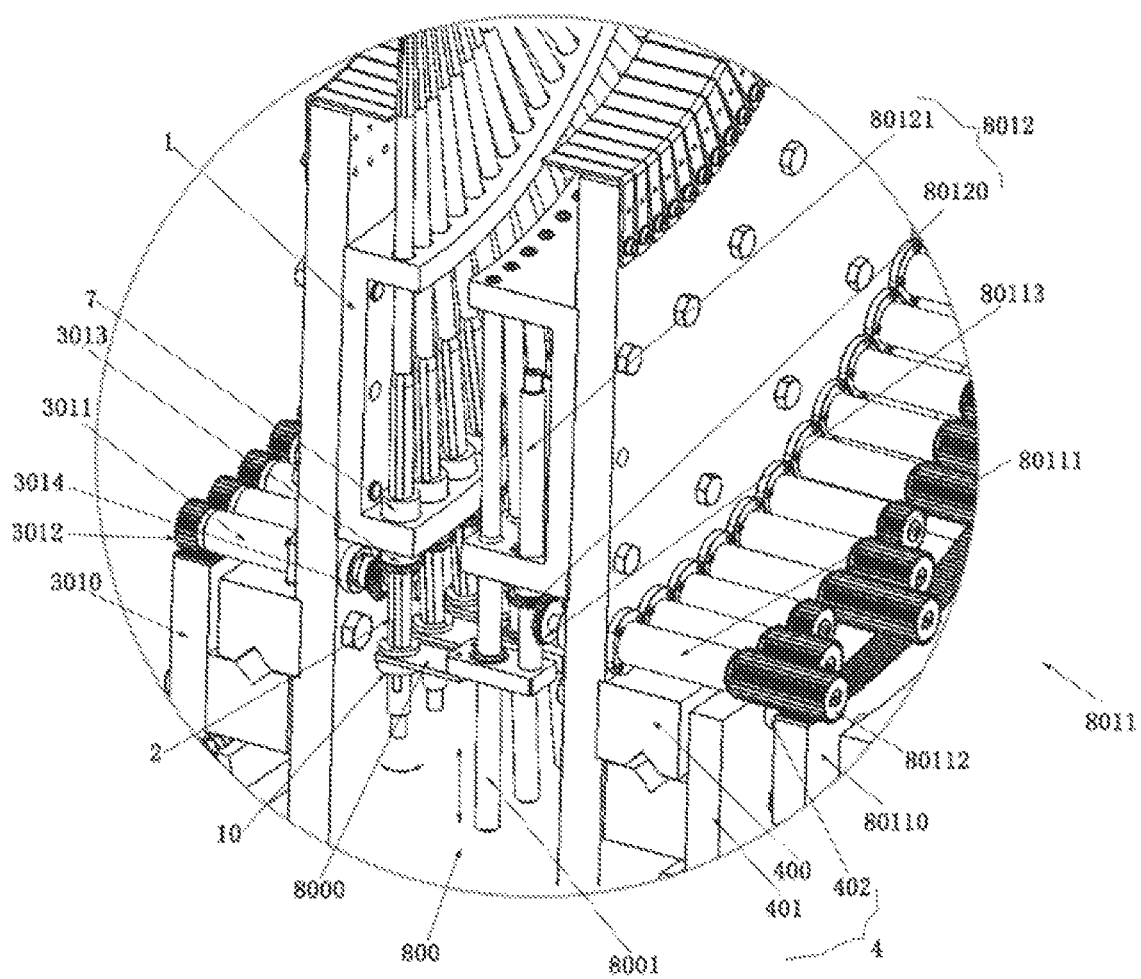
FIG. 5 is a partial enlarged view of part A in FIG. 4 according to some embodiments of the present disclosure.

FIG. 5 is a partial enlarged view of part A in FIG. 4 according to some embodiments of the present disclosure.

Figure 6:
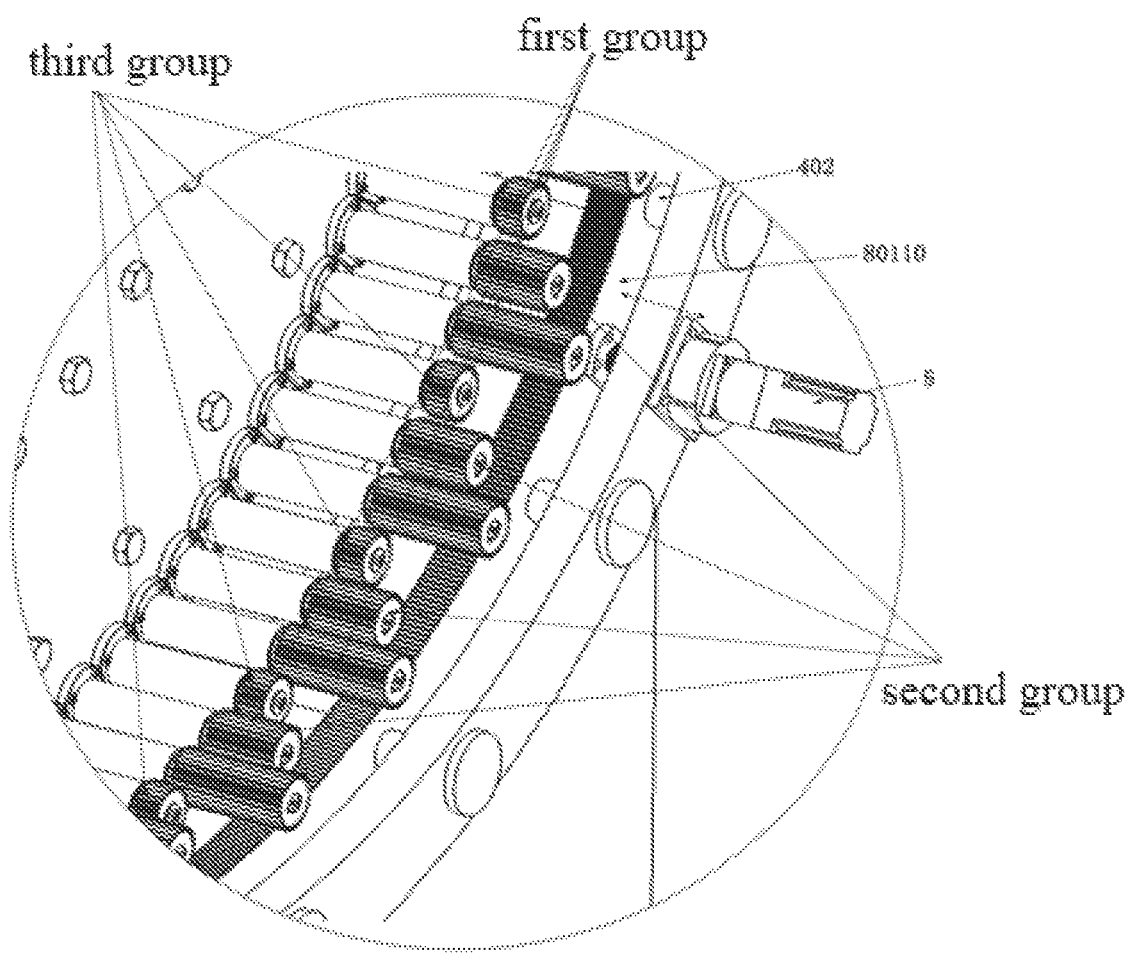
FIG. 6 is a partial enlargement view of part B in FIG. 4 according to some embodiments of the present disclosure.

FIG. 6 is a partial enlargement view of part B in FIG. 4 according to some embodiments of the present disclosure.

As shown in FIG. 5, in some embodiments, the multi-filar guide 2 may be rotationally connected to the frame body 1 through a coupling sleeve 7, the coupling sleeve 7 may be rotationally connected to the frame body 1, the multi-filar guide 2 may be slidably connected to the coupling sleeve 7, the first drive mechanism 3 may be connected to the coupling sleeve 7 to drive the multi-filar guide 2 to rotate. In some embodiments, the helical winding device may further include a telescopic mechanism 8 that drives the multi-filar guide 2 to slide along the coupling sleeve 7. Therefore, the coupling sleeve 7 may ensure the multi-filar guide 2 rotates and moves along the coupling sleeve 7 simultaneously.

The coupling sleeve may be a sleeve-shaped component used to connect two components, for example, a rebar straight thread coupling sleeve, a driving shaft coupling sleeve, a wire coupling sleeve, etc. The coupling sleeve and the multi-filar guide may be set with a plurality of structures.

In some embodiments, the coupling sleeve 7 may be provided with a protrusion, the multi-filar guide 2 may be provided with a corresponding keyway, which achieves sliding with cooperation between the keyway and the protrusion. In some embodiments, an inner hole of the coupling sleeve 7 may be set as a prismatic hole and an outside of the multi-filar guide 2 may be set as a prismatic shape to achieve sliding.

In some embodiments, a first driving gear 3013 may be fixed on the coupling sleeve 7.

Figure 7:
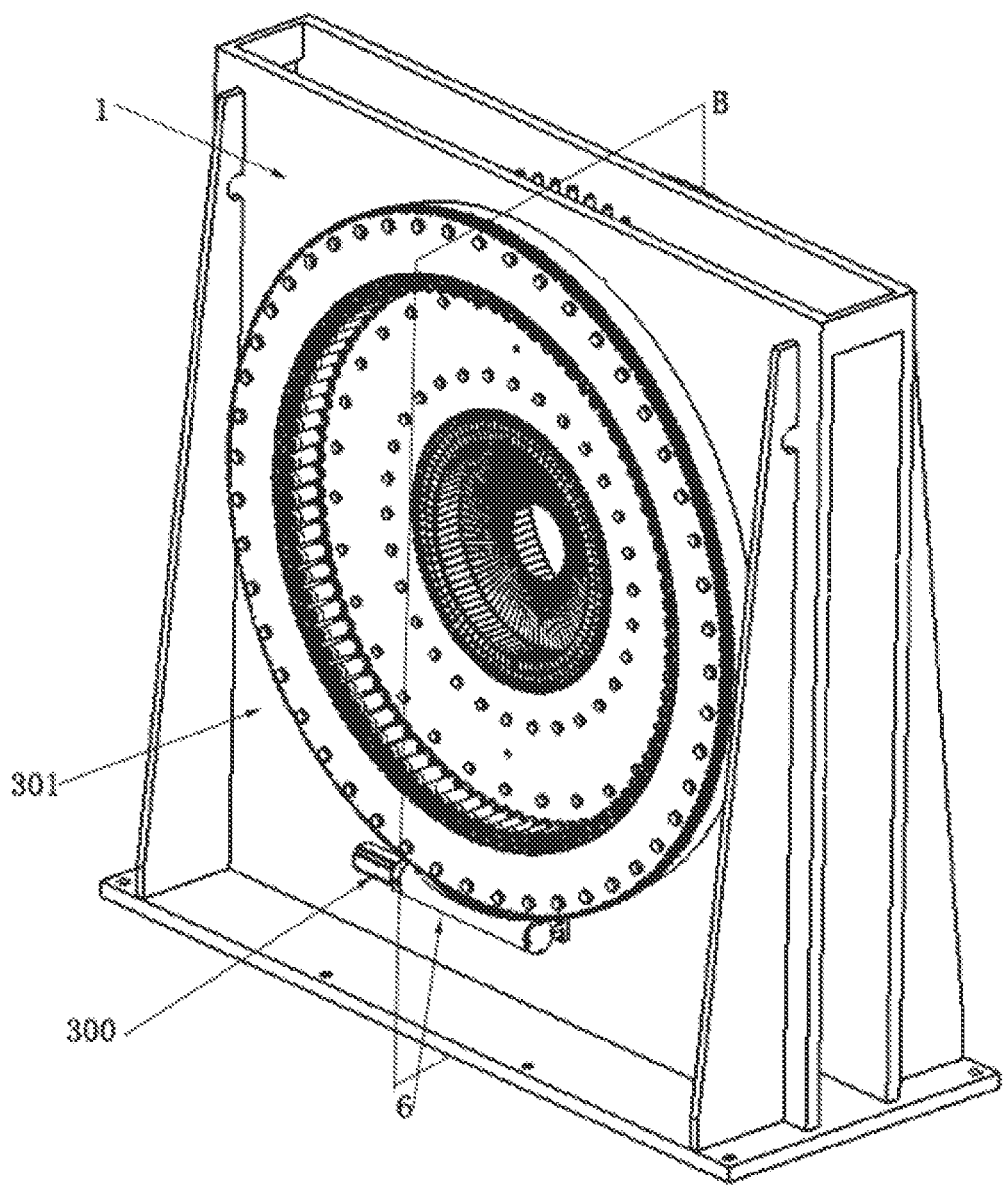
FIG. 7 is an axonometric view of the helical winding device in another direction according to some embodiments of the present disclosure.
Figure 8:
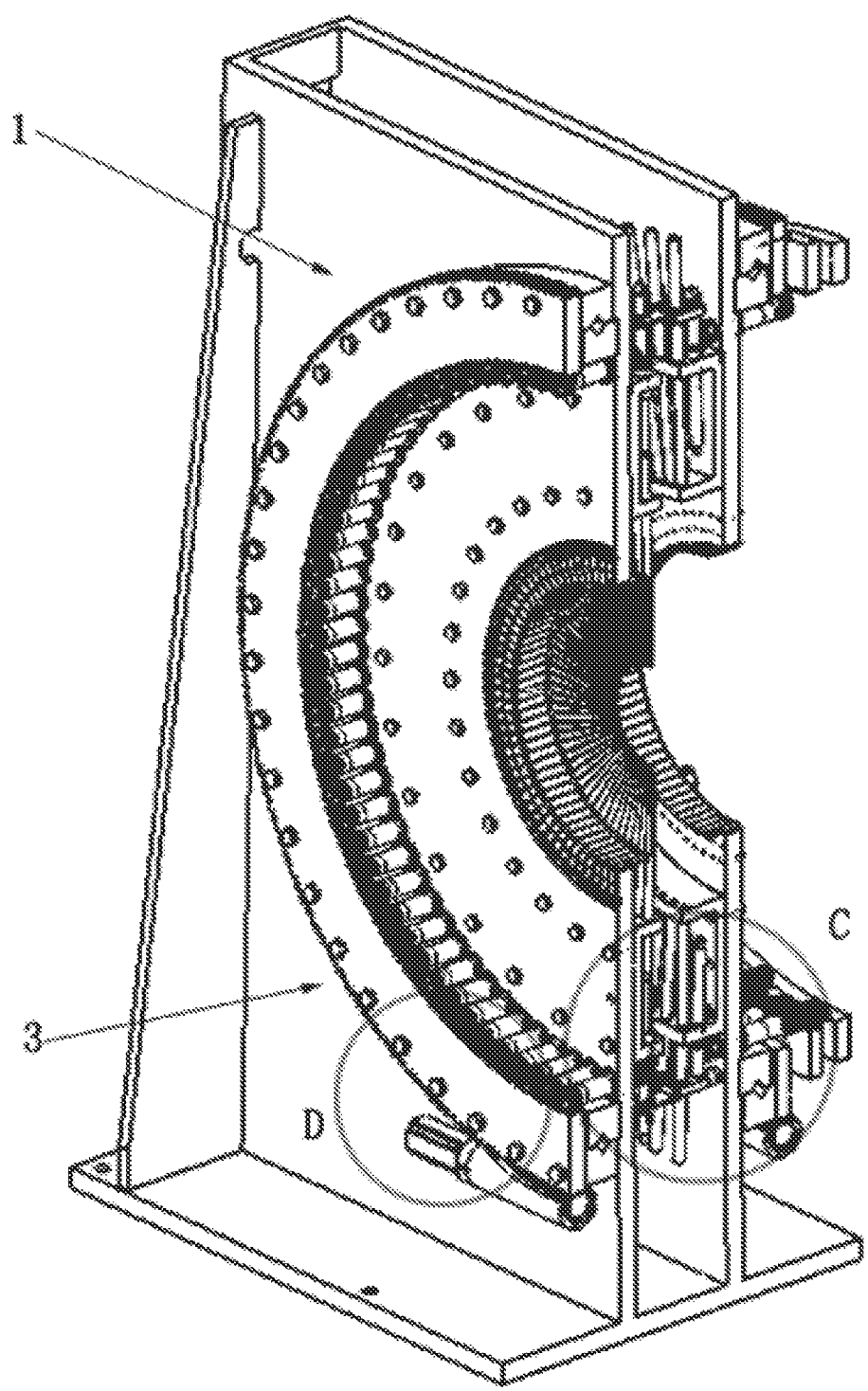
FIG. 8 is a sectional view of plane B in FIG. 7 according to some embodiments of the present disclosure.
Figure 9:
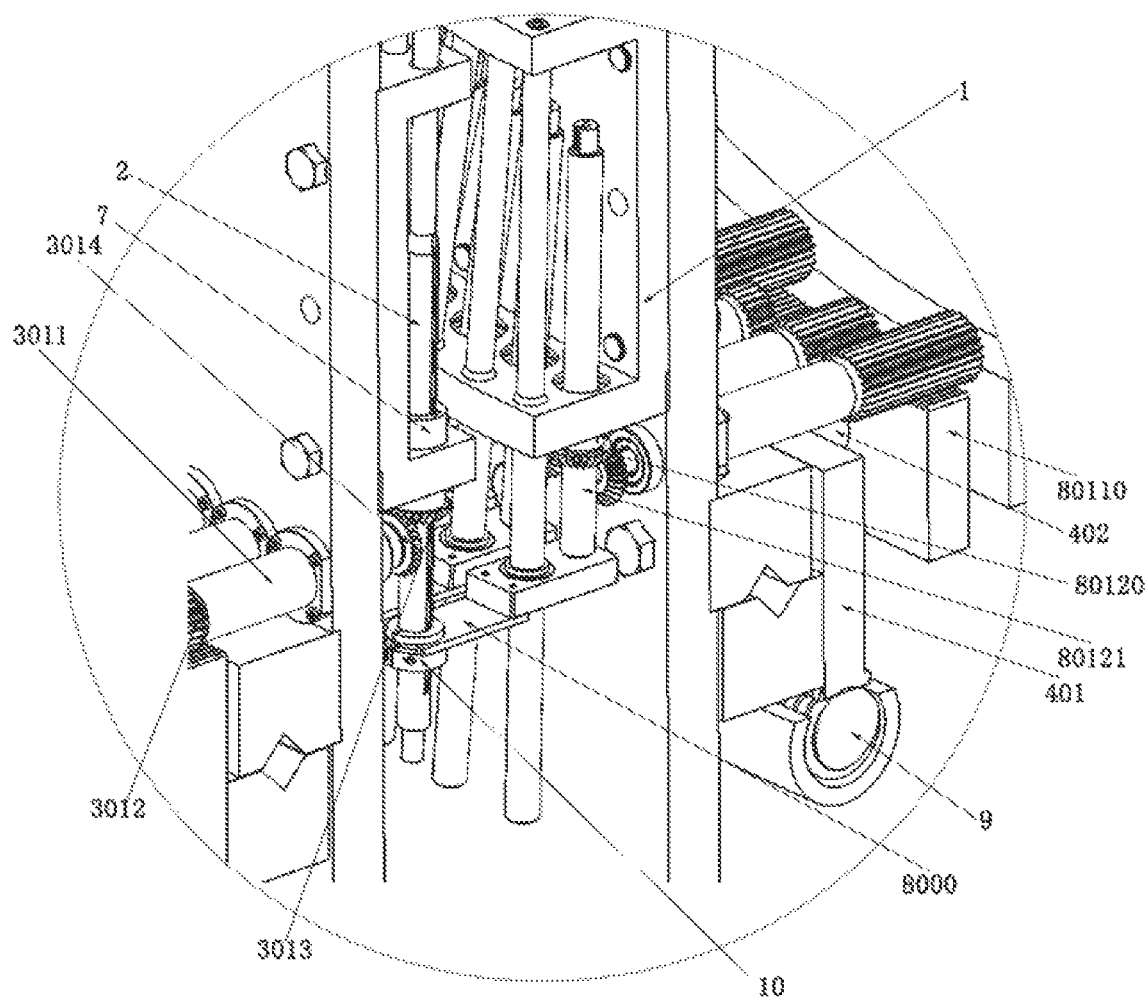
FIG. 9 is a partial enlargement view of part C in FIG. 8 according to some embodiments of the present disclosure.
Figure 10:
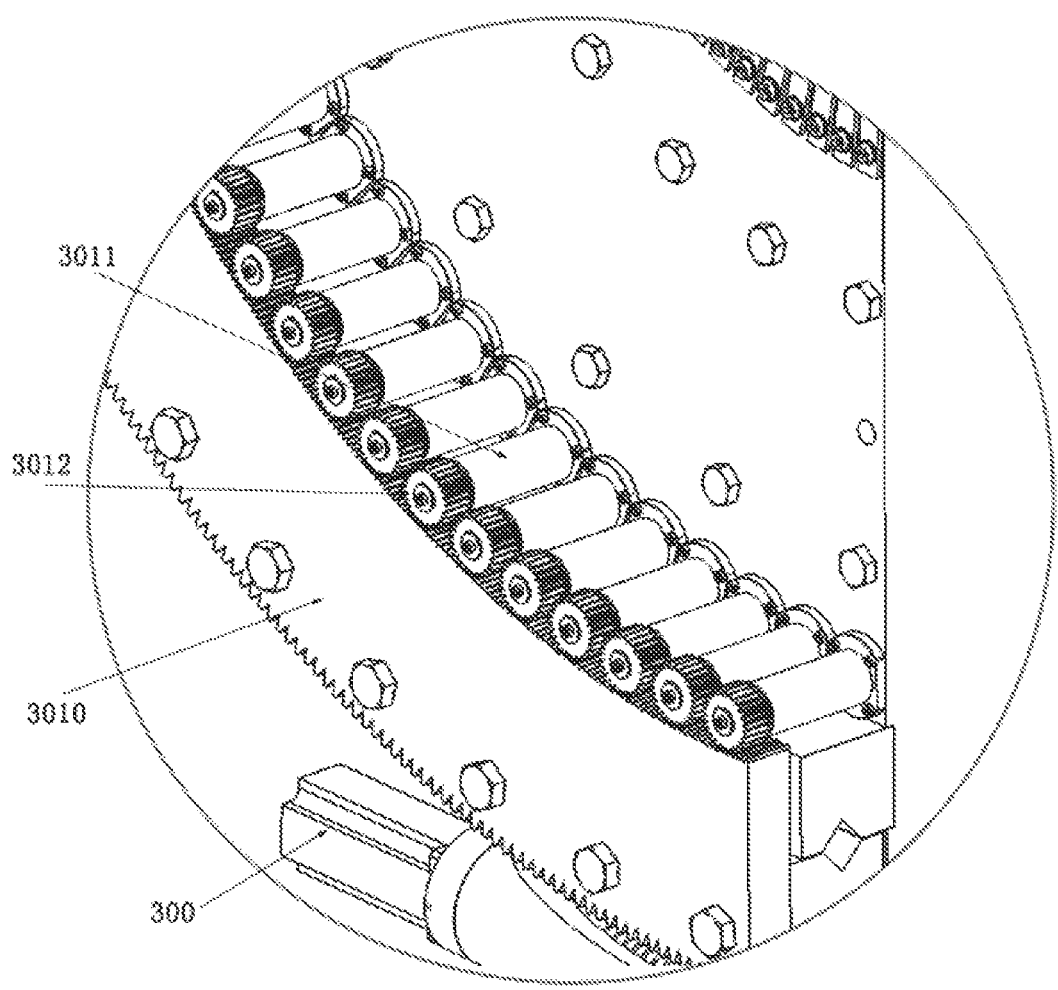
FIG. 10 is a partial enlargement view of part D in FIG. 8 according to some embodiments of the present disclosure.

FIG. 7 is an axonometric view of the helical winding device in another direction according to some embodiments of the present disclosure. FIG. 8 is a sectional view of plane B in FIG. 7 according to some embodiments of the present disclosure. FIG. 9 is a partial enlargement view of part C in FIG. 8 according to some embodiments of the present disclosure. FIG. 10 is a partial enlargement view of part D in FIG. 8 according to some embodiments of the present disclosure.

The first driving mechanism may be used to drive a component to rotate. As shown in FIG. 7, in some embodiments, the first driving mechanism 3 may include a first driving element 300 and a first gear transmission mechanism 301, the first driving element 300 may be connected to each multi-filar guide 2 through the first gear transmission mechanism 301 to drive each multi-filar guide 2 to rotate. More descriptions regarding the multi-filar guide 2 and first driving mechanism 3 may be found elsewhere in the present disclosure, e.g. FIG. 5 and the relevant descriptions thereof.

The first driving element may be an element used for driving, such as a servo motor, a hydraulic motor, etc.

The first gear transmission mechanism may be a transmission mechanism using gears, such as a reducer gearbox, a gear transmission, etc. The structure settings of the first gear transmission mechanism 301 may drive each multi-filar guide 2 to rotate, the structure of which is simply and the setting of which is reasonable.

In some embodiments, each multi-filar guide 102 may be ensured to rotate smoothly and precisely through a way of gear transmission.

As shown in FIG. 9, in some embodiments, the first gear transmission mechanism may include a gear ring 3010 and a first connecting column 3011. More descriptions regarding the first gear ring 3010 may be found elsewhere in the present disclosure, e.g. FIG. 5 and its relevant descriptions thereof.

The first gear may be used to connect and mesh with the gear to drive rotation. As shown in FIG. 5, in some embodiments, the first gear ring 2010 may be a double gear ring, inner gear of which may be meshed with a first connecting gear 3012, the first driving element 300 may be meshed with outer gear through a first worm 6 or the gears, the first worm 6 may be rotationally connected to the frame body 1. More descriptions regarding the first worm 6 may be found elsewhere in the present disclosure, e.g. FIG. 7 and its relevant descriptions thereof.

The first connecting gear may be a component that connects elements by meshing. In some embodiments, the first connecting gear 3012 may be meshed with the inner gears of the double gear ring of the first gear ring 3010.

The first worm may achieve transmission between two intersecting axes using gears and other similar elements. In some embodiments, the first worm 6 may be meshed with the outer gears of the double gear ring of the first gear ring 3010.

As shown in FIG. 10, in some embodiments, the first gear ring 3010 may be rotationally connected to the frame body 1, and the first driving element 300 may be connected to the first gear ring 3010 to drive the first gear ring 3010 to rotate.

The first connecting column may be a cylindrical element used to connect two components. As shown in FIG. 10, in some embodiments, a plurality of the first connecting columns 3011 may be rotationally connected to the frame body 1, and each multi-filar guide 2 may be connected to a first connecting column 3011.

As shown in FIG. 10, in some embodiments, the first connecting column 3011 may be driven to rotate through the rotation of the first gear ring 3010, the multi-filar guide 2 may be driven to rotate by the first connecting column 3011, one end of the first connecting column 3011 may be provided with a first connecting gear 3012 meshing with the first gear ring 3010, the other end of the connecting column 3011 may be provided with a first transmission gear 3014 meshing with the first driving gear 3013 arranged on the multi-filar guide 2. More descriptions regarding the gear ring 3010 may be found elsewhere in the present disclosure, e.g. FIG. 5 and its relevant descriptions thereof.

The first transmission gear may be transmitted with gear meshing. In some embodiments, the multi-filar guide 2 may be driven to rotate by the first connecting column 3011 through the first transmission gear 3014 on the first connecting column 3011 meshing with the first driving gear 3013 on the multi-filar guide 2.

The first driving gear may drive the driving components to rotate by gear meshing. In some embodiments, the first driving gear 3013 on the multi-filar guide 2 may drive the multi-filar guide 2 to rotate by meshing with the first transmission gear 3014 of the first connecting column 3011.

As shown in FIG. 10, in some embodiments, when rotating, the first gear ring 3010 may drive the first connecting column 3011 to rotate through meshing with the first connecting gear 3012 at one end of the first connecting column 3011, the rotation of the first connecting column 3010 may drive the multi-filar guide 2 to rotate through the first transmission gear 3014 at other end of first connecting column 3011 meshing with the first driving gear 3013 arranged on the multi-filar guide 2. Therefore, when rotating, the first gear ring 3010 may drive all the multi-filar guides to rotate. More descriptions regarding the multi-filar guide 2 and the first transmission gear 3014 may be found elsewhere in the present disclosure, e.g. FIG. 5 and the relevant descriptions thereof.

In some embodiments, the first driving mechanism 3 may be connected to the coupling sleeve 7 to drive the multi-filar guide 2 to rotate. In some embodiments, the filament helical winding device may further include the telescopic mechanism 8 that drives each multi-filar guide 2 to slide along the coupling sleeve 7. More descriptions regarding the multi-filar guide 2 and first driving mechanism 3 may be found elsewhere in the present disclosure, e.g. FIG. 4 and the relevant descriptions thereof. More descriptions regarding the connecting sleeve 7 may be found elsewhere in the present disclosure, e.g. FIG. 5 and its relevant descriptions thereof. More descriptions regarding the telescopic mechanism 8 may be found elsewhere in the present disclosure, e.g. FIG. 3 and its relevant descriptions thereof.

Figure 11:
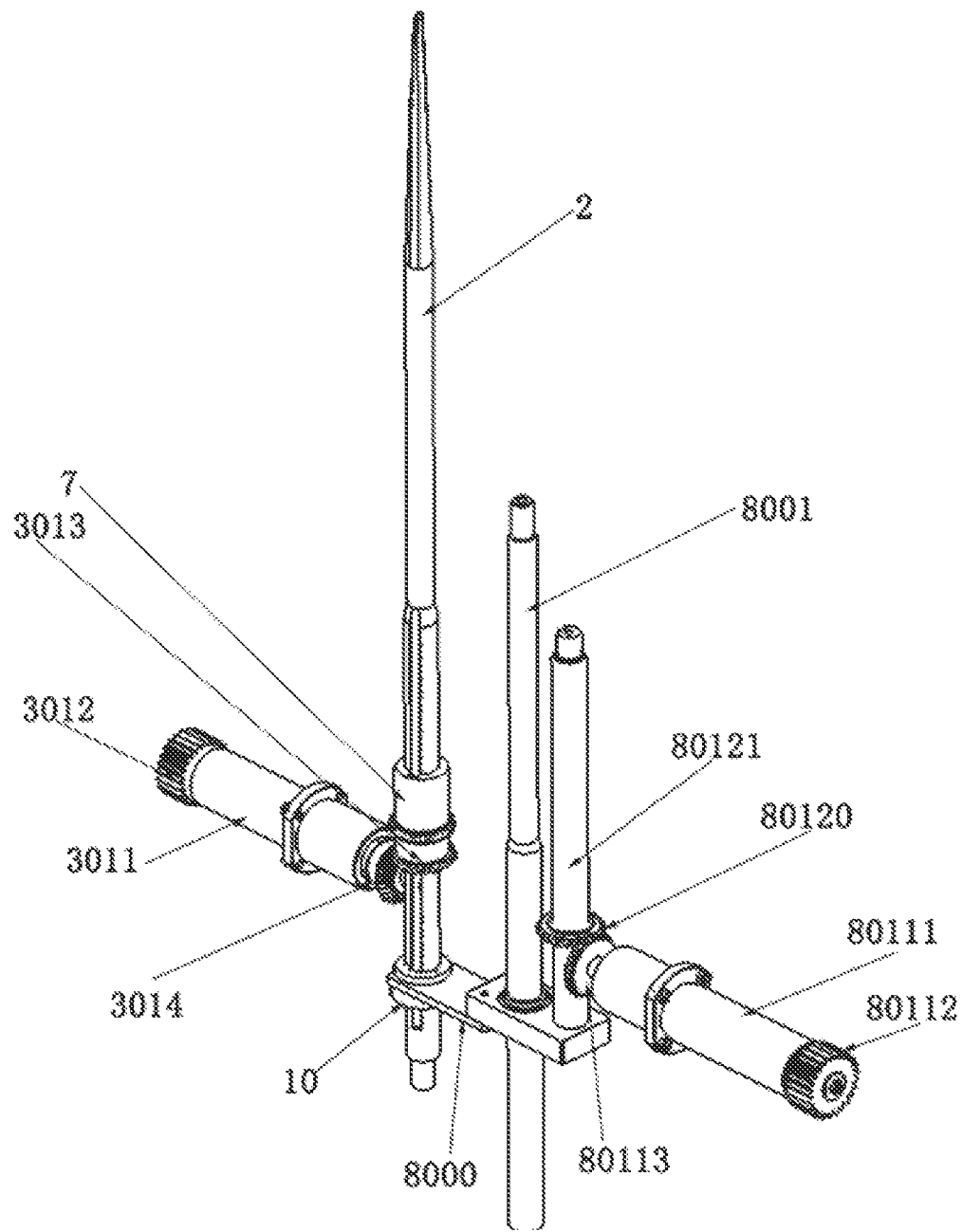
FIG. 11 is a structural diagram of a shifting fork mechanism according to some embodiments of the present disclosure.

FIG. 11 is a structural diagram of a shifting fork mechanism according to some embodiments of the present disclosure.

The telescopic mechanism may be a mechanism driven by expansion and contraction. In some embodiments, the telescopic mechanism 8 may be implemented with a plurality of structures, which may achieve the expansion and contraction of the multi-filar guide 102, for example, setting a plurality of telescopic cylinders to drive the multi-filar guide 2 to expand and contract through expansion and contraction of the telescopic cylinders. As shown in FIG. 5, in some embodiments, the telescopic mechanism 8 may include a plurality of shifting folk mechanisms and a second driving mechanism 801, and each multi-filar guide 2 may be connected to a shifting folk mechanism 800. More descriptions regarding the telescopic mechanism 8 may be found elsewhere in the present disclosure, e.g. FIG. 8 and its relevant descriptions thereof. Each multi-filar guide may be driven to slide along the coupling sleeve through the telescopic mechanism, so that the multi-filar guide may not only rotate but also expand and contract, the multi-filar guide may control the expansion and contraction of the multi-filar guide according to the shape change of the pressure vessel, thereby causing the filaments better fitting the pressure vessel to improve the winding effect.

The shifting fork mechanism may be used to control the multi-filar guide to move. As shown in FIG. 11, in some embodiments, the shifting fork mechanism 800 may include a shifting fork 8000 and a guide rod 8001, the guide rod 8001 may be fixedly connected to the frame body 1, the shifting fork 8000 may be slidable connected to the guide rod 8001, and an end of the shifting fork 8000 may be rotationally connected to the multi-filar guide 2.

In some embodiments, a clamp 10 may be fixed on the multi-filar guide 2 and provided with a groove connected to the shifting fork 8000, an end of which may be clamped into the groove to rotationally connected to the clamp 10, which may cause the connection between the shifting fork 8000 and the multi-filar guide 2 more convenient.

In some embodiments, the structure settings of the shifting fork 8000 may facilitate controlling movement of the multi-filar guide 2 without affecting rotation of the multi-filar guide 2. Moreover, compared to setting the plurality of telescopic cylinders, the shifting forks is simpler and more reasonable, which may reduce settings of unnecessary power.

The second driving mechanism may be a mechanism used to drive the other part in the filament helical winding device, which differs from the first driving mechanism. As shown in FIG. 5, in some embodiments, the second driving mechanism 801 may include a second driving element 8010, a second gear transmission mechanism 8011, and a lead screw and nut mechanism 8012. More descriptions regarding the second driving mechanism 801 may be found elsewhere in the present disclosure, e.g. FIG. 4 and its relevant descriptions thereof. More descriptions regarding the second driving element 8010 may be found elsewhere in the present disclosure, e.g. FIG. 3 and its relevant descriptions thereof.

In some embodiments, the second driving mechanism 801 may be connected to the shifting fork 8000 to drive the shifting fork 8000 to slide along a guide rod 8001.

The lead screw and nut mechanism may be a mechanism that converts rotation into movement. As shown in FIG. 5, in some embodiments, each shifting fork 8000 may be connected to a lead screw and nut mechanism 8012 in a plurality of lead screw and nut mechanisms, an end of the lead screw 80121 in the lead screw and nut mechanism 8012 may be fixedly connected to the shifting fork 8000, and the nut 80120 in the lead screw and nut mechanism 8012 may be rotationally connected to the frame body 1.

The second driving element may be an element used in the second driving mechanism, which differs from the first driving element, for example, a servo motor, a hydraulic motor, etc. As shown in FIG. 5, in some embodiments, the second driving element 8010 may drive the second gear ring

80110 to rotate through gears or a second worm 9 meshing with gears on the slewing bearing 4.

In some embodiments, the second driving element 8010 may be fixed on the frame body 1 instead of moving with the second gear ring 80110, thereby ensuring stability in the process of driving.

The second worm may be an element used in the second driving mechanism to achieve transmission between two intersecting axes by meshing, which differs from the first worm. In some embodiments, the second worm 9 may be meshed with the gears on the slewing bearing 4.

The slewing bearing may be a transmission component that needs to make relative rotation movement between two objects and bear axial force, radial force, and tipping moment at the same time. The slewing bearing may include an inner and outer ring, a rolling element, etc. In some embodiments, the slewing bearing may be provided with gears.

The second gear transmission mechanism may be a transmission mechanism using gears, which differs from the first gear transmission mechanism. As shown in FIG. 5, in some embodiments, the second gear transmission mechanism 8011 may include the second gear ring 80110 and a second connecting column 80111.

The second gear ring may be another component used to connect to gears and mesh with gears to drive gears to rotate, which differs from the first gear ring. In some embodiments, the second gear 80110 may be rotationally connected to the frame body 1 and the second gear ring 80110 may be driven to rotate through the second driving element 8010.

The second connecting column may be a cylindrical element used to connect two components, which differs from the first connecting column. In some embodiments, the plurality of second connecting columns 8011 may be rotationally connected to the frame body 1, and each lead screw and nut mechanism 8012 may be connected to a second connecting column 80111.

As shown in FIG. 5, in some embodiments, the second connecting column 80111 may be driven to rotate through the rotation of the second gear ring 80110, the second connecting column 80111 may drive the multi-filar guide 2 to expand and contract, an end of the second connecting column 80111 may be provided with a second connecting gear 80112 meshing with the second gear ring 80110, and other end of the second connecting column 80111 may be provided with a second transmission gear 80113 meshing with outer gears of the nut 80120.

The helical winding devices may achieve control separately through changing structure and drive corresponding multi-filar guides to expand and contract for performing winding operation according to a size of the workpiece, thereby achieving variable driving.

As shown in FIG. 5, in some embodiments, the second gear ring 80110 may be rotationally connected to the frame body 1 through the slewing bearing 4, the second gear ring 80110 may be slidably connected to the slewing bearing 4, and a third driving mechanism 5 may be arranged between the second gear ring 80110 and the slewing bearing 4, which may drive the second gear ring 80110 to slide axially. As shown in FIG. 6, the plurality of second connecting columns 80111 may be divided into at least two groups, the second gear ring 80110 may be meshed with second connecting gears 80112 on one or more groups of second connecting columns 80111 through the movement of the second gear ring 80110 to drive corresponding multi-filar guides to expand and contract, and the second driving element 8010 may be connected to the slewing bearing 4. In some embodiments, the number of multi-filar guides used for winding may be selected according to a size of the pressure vessel. Therefore, according to the size of the pressure vessel, the required multi-filar guides may be controlled to extend out for performing winding operation so as to achieve variable driving.

The third driving mechanism may be other components used in the driving device, which differs from the first driving mechanism and the second driving mechanism. In some embodiments, the third driving mechanism may be arranged between the second gear ring 80110 and the slewing bearing 4 to drive the second gear ring to slide axially.

As shown in FIG. 5, in some embodiments, an inner ring 400 of the slewing bearing 4 may be fixedly connected to the frame body 1, an outer gear ring 401 of the slewing bearing 4 may be slidably connected to the second gear ring 80110, or vice versa. The slidably connection may be achieved through the settings of a corresponding sliding groove, a corresponding sliding column 402, and more structures. For example, the outer gear ring 401 may be provided with the sliding column 402, the second gear ring 80110 may be connected to the sliding column 402 and the second gear ring 80110 may be provided with corresponding connecting hole. The third driving mechanism 5 may be various elements with telescopic function, such as an electric telescopic cylinder, a screw elevator, etc. Taking the electric telescopic cylinder as an example, a cylinder of the electric telescopic cylinder may be fixedly connected to the second gear ring 80110, a rod body of the electric telescopic cylinder may be fixed with the outer gear ring 401, and the sliding of the second gear ring 80110 may be achieved through the expanding and contraction of the rod body. More descriptions regarding the third driving mechanism 5 may be found elsewhere in the present disclosure, e.g. FIG. 3 and its relevant descriptions thereof.

As shown in FIG. 5, in some embodiments, a number of the second connecting column 80111 may be set as 60, which may be divided into three groups, and each group may include 20 connecting columns (for another example, the second connecting columns may also be evenly divided). When moving, the second connecting gear ring 801110 may be meshed with the second connecting gear 80112 on the second connecting columns 80111 of the first group (the number of the second connecting columns in the first group being 20) to drive 20 second connecting columns 80111 to rotate, that is, 20 multi-filar guides may be driven to extend out for winding the workpiece with a small size. When continuing to move, the second gear ring 801110 may be meshed with the second connecting gear 80112 on the second connecting columns 80111 of two groups (e.g., the first group and second group) to drive 40 second connecting columns 80111 to rotate, that is, 40 multi-filar guides may be driven to extend out for winding the workpiece with a medium size. When continuing to move, the second gear ring 80110 may be meshed with the second connecting gear 80112 on the second connecting columns 8011 of three groups (all the groups) to drive 60 second connecting columns to rotate, that is, 60 multi-filar guides may be driven to extend out for winding the workpiece with a large size.

As shown in FIG. 5, in some embodiments, an axial length of the second connecting gear 80112 on second connecting columns 80111 in each group may be set to be different, and the axial length of the second connecting gear 80112 in each group may gradually increase or decrease to ensure that the second gear ring 80110 may be meshed with the corresponding second connecting gear 80112 during the movement, so as to change (increase or decrease) the number of the second connecting gear meshing with the second gear ring. Of course, the above functions may be realized by changing the setting position of the second connecting gear 80112 in each group.

As shown in FIG. 5, in some embodiments, a number of the second connecting columns may be set as 60, which may be divided into three groups. The axial length of the second connecting gear 80112 on the second connecting column 80111 in the first group is larger than the axial length of the second connecting gear 80112 on the second connecting column 80111 in the second group, and the axial length of the second connecting gear 80112 on the second connecting column 80111 in the second group is larger than the axial length of the second connecting gear 80112 on the second connecting column 80111 in the third group. Therefore, when moving, the second gear ring may be meshed with the second connecting gear 80112 in the first group, when continuing to move, the second gear ring may be meshed with the second connecting gear 80112 in the first and second group simultaneously, and when continuing to move, the second gear ring 80110 may be meshed with the second connecting gear 80112 in the first, second, and third groups simultaneously.

The second gear ring 80110 is not only driven to move through a third driving mechanism 5, but also driven to rotate through the second driving element 8010. Therefore, the methods may be adopted as following: appropriately increasing the axial length of the second gear ring 80110 to ensure that it may be connected to a second driving element 8010 no matter how the second gear ring moves, and the slidably connection between the second driving element 8010 and the slewing bearing 4 or the frame body 1 to ensure that the second driving element 8010 may be moved with the second gear ring 80110. In conclusion, the second gear ring 80110 is connected to the second driving element 8010 to drive the second gear ring 80110 to rotate via the plurality of structures.

Figure 12:
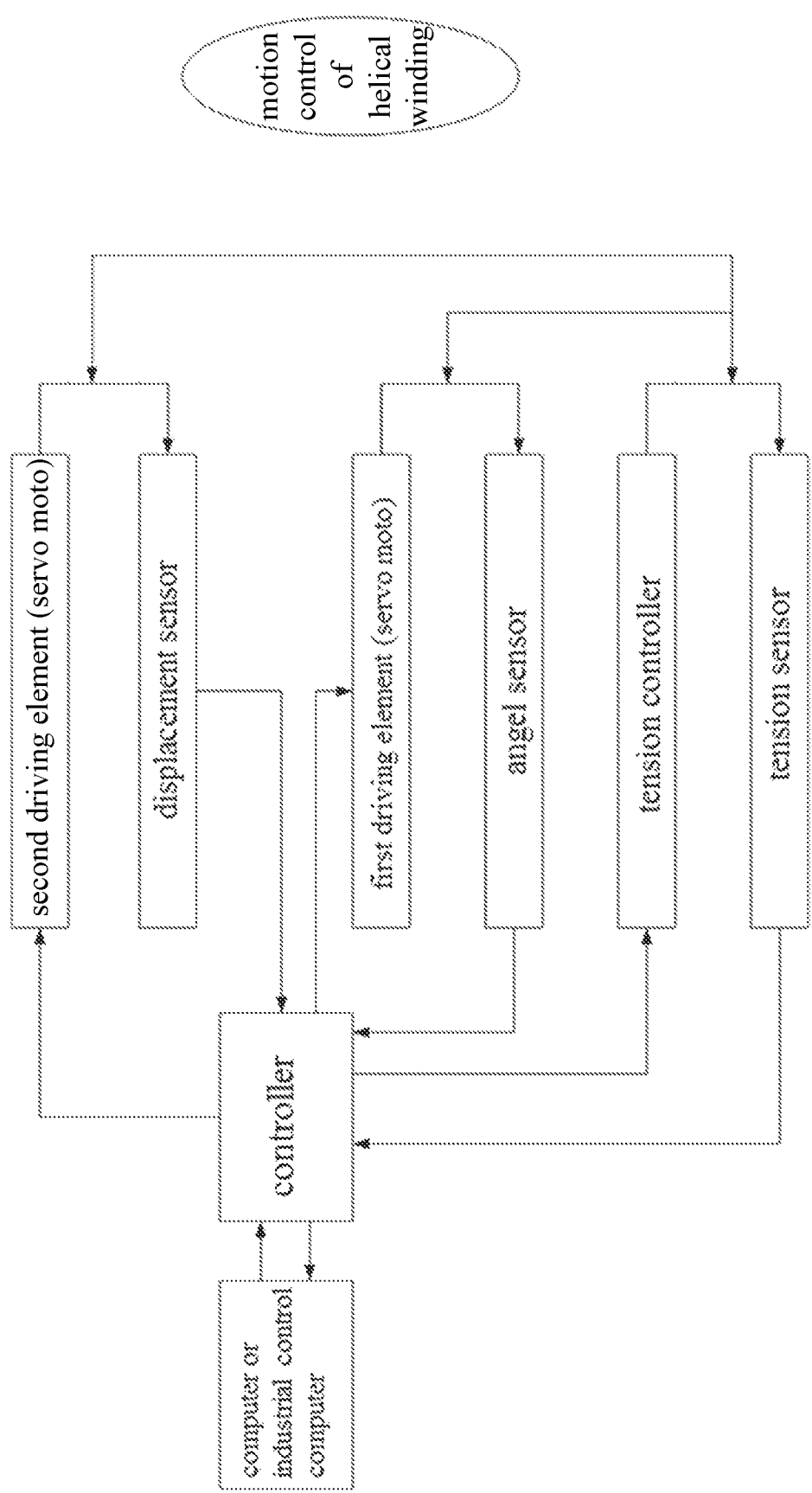
FIG. 12 is a schematic diagram of a control system according to some embodiments of the present disclosure.

FIG. 12 is a schematic diagram of a control system according to some embodiments of the present disclosure.

As shown in FIG. 12, in some embodiments, the helical winding device may include a control system for achieving the entire automatic operation of the helical winding device. The control system may include an industrial computer, a controller, a displacement sensor, and an angle sensor. The controller may be connected to the industrial computer, the displacement sensor, the second driving element, the angle sensor, and the first driving element. The first driving element and the second driving element may be controlled by sending instructions to the controller from the industrial computer through measuring the expansion and contraction of the multi-filar guide using the displacement sensor, measuring the rotation of the multi-filar guide using the angle sensor.

As shown in FIGS. 1 and 2, in some embodiments, corresponding sensors may be set to control other components involved in the spiral winding. For example, the filaments extended out from the creel may enter the multi-filar guide via a tension controller, thus a corresponding sensor may be set at the tension controller to control the tension, the corresponding displacement sensor and angle sensor may be set at the fixing device for fixing the workpiece to control the rotation and movement of the workpiece.

In some embodiments, the corresponding control system may be developed to achieve automation according to the actual situation.

In some embodiments, the control system may include the controller, the displacement sensor, the angle sensor, and the displacement sensor and the angle sensor may communicate with the controller. The displacement sensor may measure the expansion and contraction of the multi-filar guide, and the angle sensor may measure the rotation of the multi-filar guide. The controller may receive information detected from the displacement sensor and the angle sensor and send the control instructions to the multi-filar guide to correspondingly control the movement of the multi-filar guide based on the process of the detected information.

In some embodiments, the control system may predict position of the multi-filar guide based on the parameters of the workpiece, the displacement information of the multi-filar guide, and the angle information of the multi-filar guide. In some embodiments, the position of the multi-filar guide may be predicted based on a prediction model, which may be a machine learning model. An input of the prediction model may include the parameters of the workpiece, and the displacement information and the angel information of the current and the previous (or a plurality of time point previous) multi-filar guide, and an output of the prediction model may include the position information of the subsequent (i.e., time points in the future) multi-filar guide.

In some embodiments, the control system may also determine a risk probability of unqualified winding based on the predicted position information of multi-filar guide determined by the prediction model, and the unqualified winding may include filament winding stack, uneven spacing between the filaments, etc.

In some embodiments, the prediction model may include a feature layer, a sequence layer, and a first prediction layer. An input of the feature layer may include the parameters of the workpiece, and an output of the feature layer may be a feature vector of the workpiece. An input of the sequence layer may be the displacement information and angel information of the current and the previous (or the plurality of time points previous) multi-filar guide, and an output of the sequence layer may be a sequence feature of the position. An input of the first prediction layer may be the feature vector of the workpiece and the sequence feature of the position, and an output of the first prediction layer may be subsequent position information of the multi-filar guide. In some embodiments, the prediction model may further include a second prediction layer, an input of the second prediction layer may be the sequence feature of the position and the subsequence position information of the multi-filar guide output from the first prediction layer, and an output of the second prediction layer may be a risk probability of unqualified winding.

In some embodiments, the prediction model may be obtained from a plurality of first training samples with the labels. The first training samples may be parameters of the sample workpiece, the displacement information and angle information of the sample multi-filar guide at a plurality of time points. The labels of the first training samples may be whether the sample winding is qualified and the position of the sample multi-filar guide at the time point after the plurality of time points. For example, a plurality of labeled first training samples may be input into an initial prediction model, a loss function may be constructed through the labels and the prediction results of the initial prediction model, parameters of the prediction model may be updated based on the iterations of the loss function, and a training of the initial prediction model may be completed when the loss function of the initial prediction model satisfies a preset condition. The preset condition may include a convergence of the loss function, a number of the iterations that reaches a threshold, etc. In some embodiments, the first training samples may be obtained based on historical production data of the device.

In some embodiments, in response to determination that the risk probability of the unqualified winding is greater than a threshold, the control system may send early warning information to remind manual adjustment. In some embodiments, the control system may determine adjustment parameters of the multi-filar guide by an adjustment model and send the control instructions to the multi-filar guide based on the adjustment parameters.

In some embodiments, the adjustment model is a machine learning model. An input of the adjustment model may be operation parameters of the multi-filar guide after adjustment, parameters of the workpiece, the displacement information and angel information of the current and previous (or a plurality of time points previous) multi-filar guide, and an output of the adjustment model may be the risk probability of unqualified winding. The corresponding adjustment parameters that the risk probability of unqualified winding is less than the threshold may be generated to the control instructions.

In some embodiments, the adjustment model may be obtained from a second training samples and the labels. The second training samples may include the operation parameters of the sample multi-filar guide, the parameters of the sample workpiece, and the displacement information and angle information of the sample multi-filar guide at the plurality of time points. The labels of the second training samples may be whether the sample winding is qualified. In some embodiments, the second training sample may be obtained based on historical production data of the device.

The basic concepts have been described above, apparently, in detail, as will be described above, and do not constitute a limitation of the present disclosure. Although there is no clear explanation here, those skilled in the art may make various modifications, improvements, and corrections for the present disclosure. This type of modifications, improvements, and corrections are recommended in the present disclosure, so such corrections, improvements and amendments still belong to the spirit and scope of the exemplary embodiment of the present disclosure.

Meanwhile, the present disclosure uses specific words to describe embodiments of the present specification. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not used to define the order of the present specification processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the object of the present disclosure needs more features than those mentioned in the claims. In fact, the features of the embodiment are less than all the features of the single embodiment disclosed above.

In some embodiments, numbers describing the number of components and attributes are used. It should be understood that such numbers used for the description of embodiments are corrected by the modifiers "about", "approximate" or "substantially" in some examples. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider the specified significant digits and adopt the method of general digit reservation. Although the numerical domains and parameters used in the present disclosure are used to confirm its range breadth, in the specific embodiment, the settings of such values are as accurate as possible within the feasible range.

Contents of each of patents, patent applications, publications of patent applications, and other materials, such as articles, books, specifications, publications, documents, etc., referenced herein are hereby incorporated by reference, Except for the application history documentation of the present specification or conflict, there is also an except for documents (currently or after the present disclosure) in the widest range of documents (currently or later). It should be noted that if the description, definition, and/or terms used in the appended materials of the present disclosure are inconsistent or conflicts with the content described in the present disclosure, the use of the description, definition and/or terms of the present disclosure shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and introduced.

What is claimed is:

1. A filament helical winding device, comprising a frame body, a plurality of multi-filar guides, and a telescopic mechanism, wherein
the frame body is provided with a first driving mechanism that drives each multi-filar guide to rotate; and the telescopic mechanism drives each multi-filar guide to slide; and
the telescopic mechanism includes a plurality of shifting fork mechanisms and a second driving mechanism, each multi-filar guide is connected to a shifting fork mechanism in the plurality of shifting fork mechanisms, and the second driving mechanism is connected to the shifting fork to drive the shifting fork to drive each multi-filar guide to slide.

2. The filament helical winding device of claim 1, wherein the frame body is provided with a through-hole, the plurality of multi-filar guides distributed in a circumference along a center of the through-hole are rotationally connected to the frame body, and filament is extended out from each multi-filar guide in the plurality of multi-filar guides.

3. The filament helical winding device of claim 1, wherein each multi-filar guide is rotationally connected to the frame body through a coupling sleeve, the coupling sleeve is rotationally connected to the frame body, each multi-filar guide is slidably connected to the coupling sleeve.

4. The filament helical winding device of claim 3, wherein the first driving mechanism is connected to the coupling sleeve to drive each multi-filar guide to rotate.

5. The filament helical winding device of claim 4, wherein the second driving mechanism drives each multi-filar guide to slide along the coupling sleeve.

6. The filament helical winding device of claim 1, wherein the shifting fork mechanism includes a shifting fork and a guide rod, the guide rod is fixedly connected to the frame body, the shifting fork is slidably connected to the guide rod, and one end of the shifting fork is rotationally connected to the multi-filar guide.

7. The filament helical winding device of claim 6, wherein the second driving mechanism is connected to the shifting fork to drive the shifting fork to slide along the guide rod.

8. The filament helical winding device of claim 1, wherein the second driving mechanism includes a second driving element, a second gear transmission mechanism, and a plurality of lead screw and nut mechanisms, each shifting fork is connected to a lead screw and nut mechanism, one end of lead screw in the lead screw and nut mechanism is fixedly connected to the shifting fork, and nut in the lead screw and nut mechanism is rotationally connected to the frame body.

9. The filament helical winding device of claim 8, wherein the second gear transmission mechanism includes a second gear ring and a plurality of second connecting columns.

10. The filament helical winding devices of claim 9, wherein the second gear ring is rotationally connected to the frame body, and the second gear ring is driven to rotate through the second driving element.

11. The filament helical winding device of claim 9, wherein the plurality of second connecting columns are rotationally connected to the frame body, each lead screw and nut mechanism is connected to a second connecting column in the plurality of second connecting columns, the second connecting column is driven to rotate through rotation of the second gear ring, the second connecting column drives the multi-filar guide to expand and contract, and one end of the second connecting column is provided with a second connecting gear meshing with the second gear ring, and the other end of the second connecting column is provided with a second transmission gear meshing with the external gears of the nut.

12. The filament helical winding device of claim 11, wherein the second gear ring is rotationally connected to the frame body through a slewing bearing, the second gear ring is slidably connected to the slewing bearing, a third driving mechanism is arranged between the second gear ring and the slewing bearing, the second gear ring is driven to slide axially through the third driving mechanism, the plurality of second connecting columns is divided into at least two groups, the second gear ring is meshed with second connecting gears on one or more groups of second connecting columns through movement of the second gear ring to drive corresponding multi-filar guide to expand and contract, and the second driving element is connected to the slewing bearing.

13. The filament helical winding device of claim 1, wherein the multi-filar guide is a hollow rod with two openings at both ends, the filament enters the hollow rod from an opening at one end and extends out from other opening at the other end, a shape of the other opening of the other end of the hollow rod is same as a cross-section shape of the filament.

14. The filament helical winding device of claim 13, wherein the other end of the hollow rod is flat.

15. The filament helical winding device of claim 1, wherein the first driving mechanism includes a first driving element and a first gear transmission mechanism, and the first driving element is connected to each multi-filar guide through the first gear transmission mechanism to drive each multi-filar guide to rotate.

16. The filament helical winding device of claim 15, wherein the first gear transmission mechanism includes a first gear ring and a plurality of first connecting columns.

17. The filament helical winding device of claim 16, wherein the first gear ring is rotationally connected to the frame body, and the first driving element is connected to the first gear ring to drive the first gear ring to rotate.

18. The filament helical winding device of claim 16, wherein the plurality of first connecting columns are rotationally connected to the frame body, each multi-filar guide is connected to a first connecting column in the plurality of first connecting columns, the first connecting column is driven to rotate through rotation of the first gear ring, the first connecting column drives the multi-filar guide to rotate, one end of the first connecting column is provided with a first connecting gear meshing with the first gear ring, and the other end of the first connecting column is provided with a first transmission gear meshing with a first driving gear on the multi-filar guide.

19. The filament helical winding device of claim 16, wherein the first gear ring is a double gear ring, inner gear of which is meshed with the first connecting gear, outer gear of which is meshed with the first driving element through a first worm or gears, and the first worm is rotationally connected to the frame body.

20. The filament helical winding device of claim 12, wherein the second driving element is meshed with gears of the slewing bearing through gears or a second worm to drive the second gear ring to rotate.

* * * * *

UNITED STATES PATENT AND TRADEMARK OFFICE
CERTIFICATE OF CORRECTION

PATENT NO. : 11,794,401 B2
APPLICATION NO. : 18/048044
DATED : October 24, 2023
INVENTOR(S) : Jianguo Liang et al.

Page 1 of 1

It is certified that error appears in the above-identified patent and that said Letters Patent is hereby corrected as shown below:

On the Title Page

Item (30), "Jun. 7, 2021 (CN) ................ 202110633540.1" should read --Jun. 7, 2021 (CN) ................ 202110633540.3--.

Signed and Sealed this
Fifth Day of December, 2023

Katherine Kelly Vidal
*Director of the United States Patent and Trademark Office*